July 11, 1933.　　　　L. W. VACHON　　　　1,917,782

LAWN MOWER

Filed Dec. 21, 1929　　　3 Sheets-Sheet 1

INVENTOR

Lewis W. Vachon

BY *[signature]*

ATTORNEY

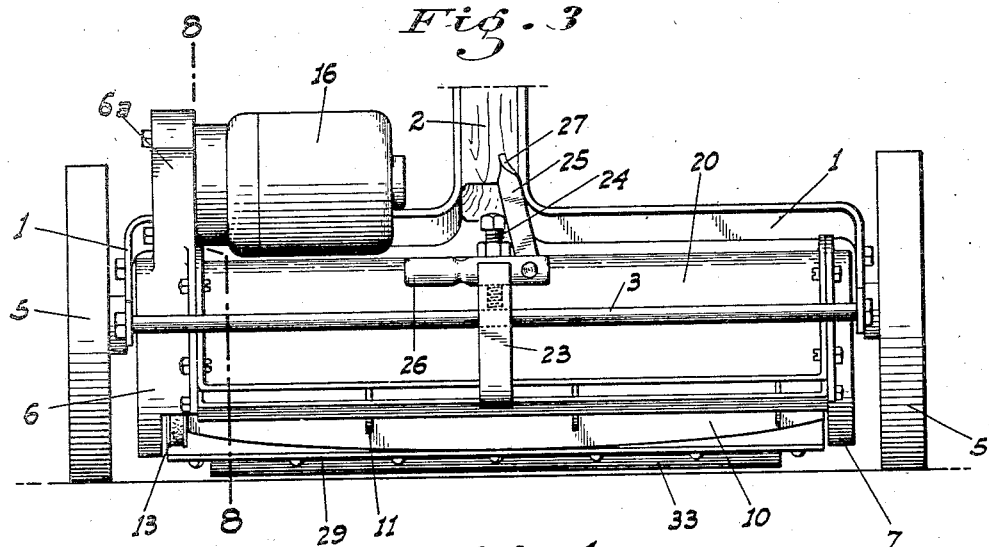
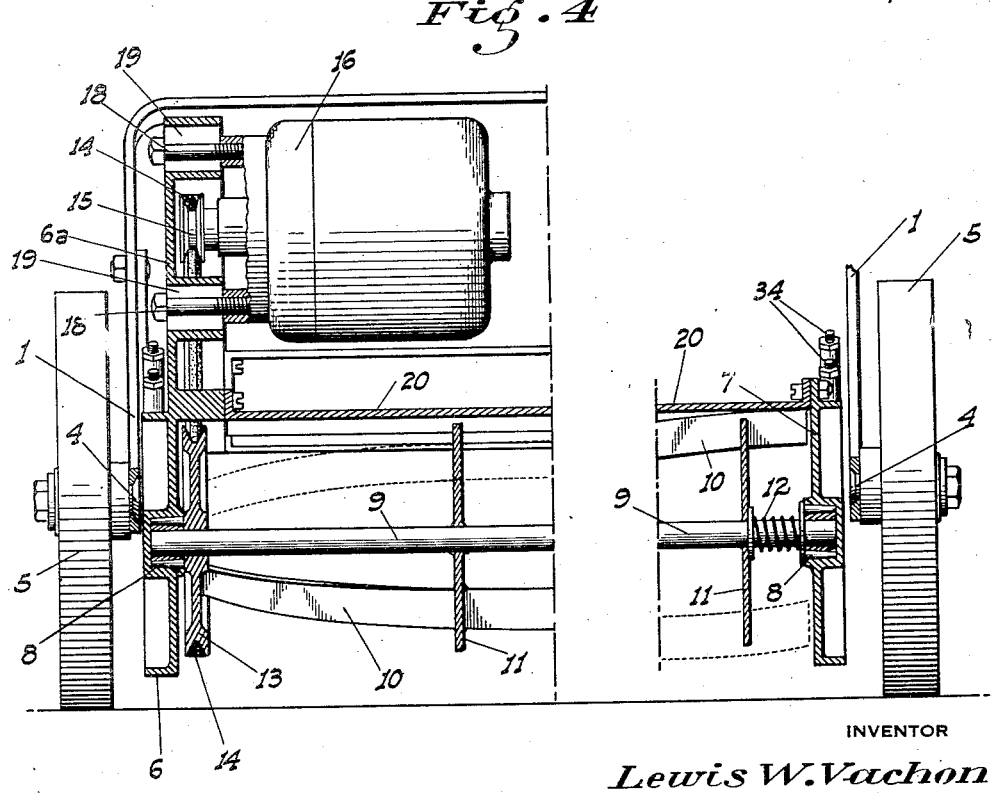

July 11, 1933. L. W. VACHON 1,917,782
LAWN MOWER
Filed Dec. 21, 1929  3 Sheets-Sheet 3
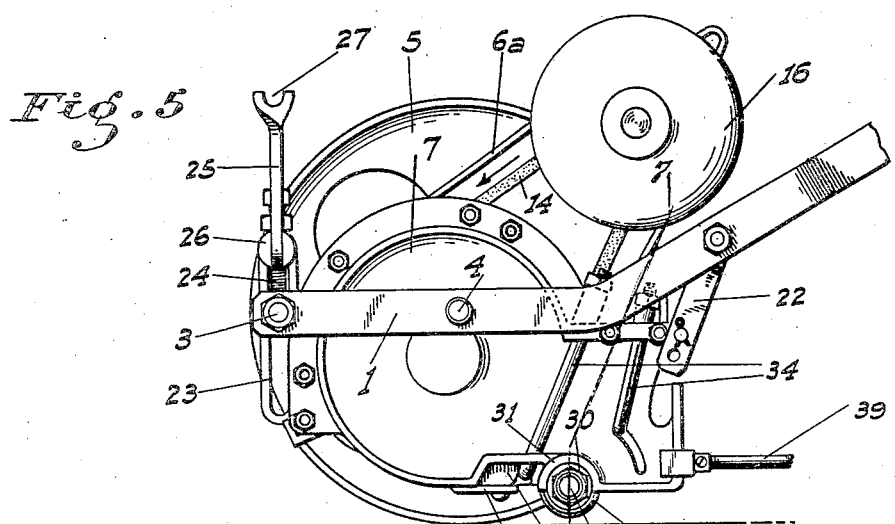
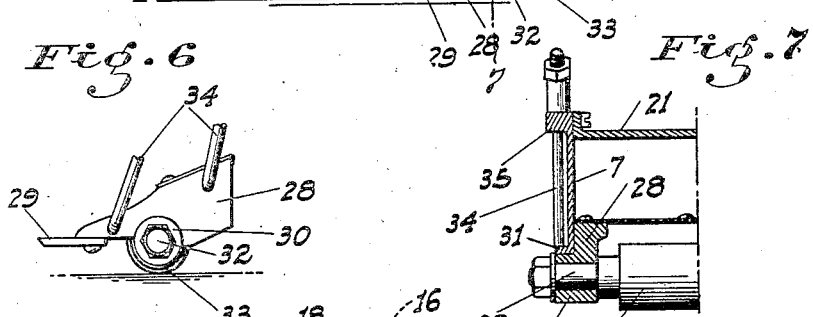
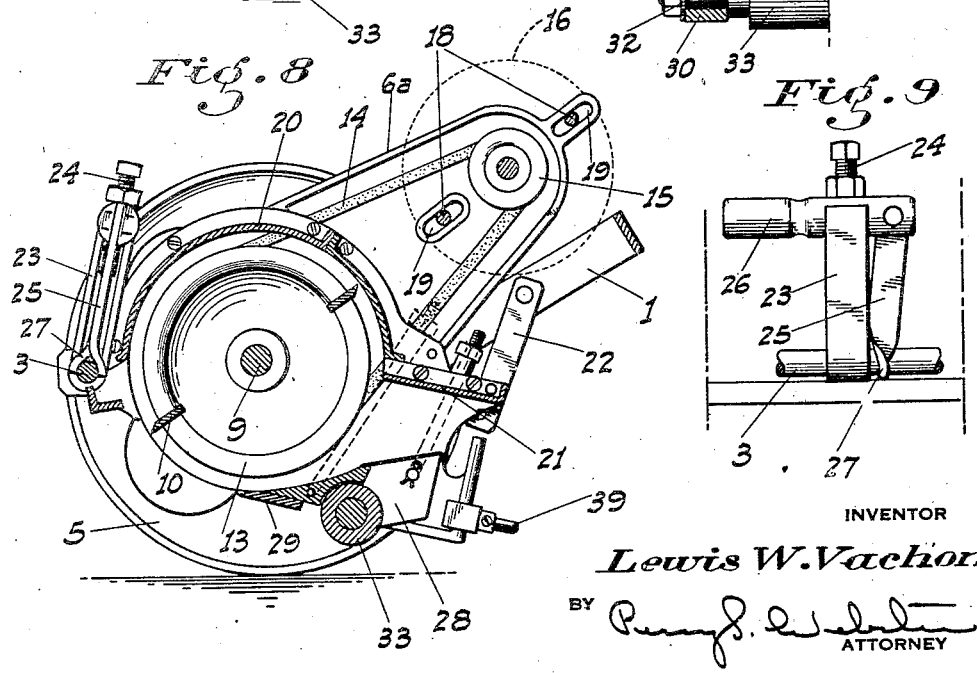
INVENTOR
Lewis W. Vachon Patented July 11, 1933

1,917,782

UNITED STATES PATENT OFFICE

LEWIS W. VACHON, OF STOCKTON, CALIFORNIA, ASSIGNOR TO PLINY E. HOLT, OF STOCKTON, CALIFORNIA

LAWN MOWER

Application filed December 21, 1929. Serial No. 415,649.

This invention relates to lawn mowers of the self-contained power driven type for cutting relatively large lawns, and particularly represents improvements over the structure shown in Patent No. 1,669,471 granted May 15th, 1928, to George D. Jones.

The principal objects of the present invention are to mount the reel and the power unit in a carriage separate from the truck so that this unit may be easily removed when necessary and in such a manner that uneven strains on the reel incident to operation are relieved and the blades cannot get out of proper alinement; to provide a simple adjustment for the reel so that the height of cut may be altered or the mower may be raised well clear of the ground for transportation; to arrange the reel relative to certain other parts of the structure so as to prevent the blades from "scalping" high spots or hummocks in the lawn, while at the same time reducing the usual heavy resistance or drag of the structure on the ground; to provide for the support of a grass catching receptacle so that its load is not taken by the operator; to simplify the mounting of the driving motor so that the driving belt may be easily adjusted or the motor removed; and to generally improve and simplify the construction and arrangement of the parts of the structure as a whole.

These objects I accomplish by means of such structure and relative arrangement of parts as will fully appear by a perusal of the following specification and claims.

In the drawings similar characters of reference indicate corresponding parts in the several views:

Fig. 3 is a front end view of the device.

Fig. 4 is an enlarged transverse vertical section of the same.

Fig. 5 is an enlarged fragmentary side elevation showing the reel in its operative position.

Fig. 6 is a fragmentary side elevation of the fixed blade and roller unit.

Fig. 7 is a fragmentary cross section on the line 7—7 of Fig. 5.

Fig. 8 is a fragmentary longitudinal section of the structure showing the reel in its fully raised or transporting position, taken on the line 8—8 of Fig. 3.

Fig. 9 is an end view of the mower adjusting and raising mechanism.

Figure 1:
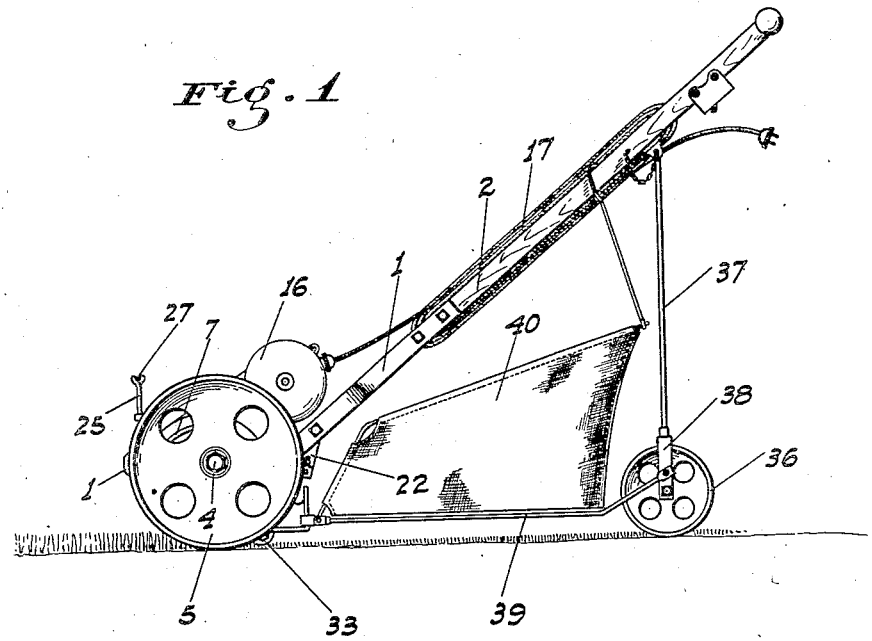
Fig. 1 is a side elevation of the complete mower in its operative position.

Referring now more particularly to the characters of reference on the drawings, the numeral 1 denotes a pair of transversely spaced side frames which are horizontal at their forward ends and then extend upwardly and in converging relation to each other and are rigidly secured to a centrally disposed handle bar 2 of common form which practically forms a part of the frame structure itself. The forward ends of the frames 1 are rigidly connected by a cross rod 3 which also may be considered as being a part of the frame. Rearwardly of the rod short spindles 4 project outwardly from the frames on which the main ground bearing wheels 5 are mounted.

Disposed just inside the frames toward their forward ends are solid casing-heads 6 and 7 having taper roller bearings 8 mounted therein which form journals for the shaft 9 of the reel. This reel comprises a plurality of blades 10 arranged in the usual spiral relation to the shaft, which blades are connected to the shaft at intervals by a number of solid discs 11, arranged in spaced relation along the shaft. This shaft is disposed when the reel is in operative position so that it is substantially alined with the spindles 4 in the longitudinal plane of the structure.

The disc nearest the head 7 is spaced sufficiently therefrom to leave space along the shaft for the reception of a compression spring 12 thereon between the disc and the adjacent bearing so as to act to constantly keep both bearings snug, and of course taking up wear as it occurs. The endmost disc at the other end of the reel shaft is immediately adjacent the corresponding casing head 6 and is formed as a grooved sheave 13 for the reception of a V section belt 14. This belt extends upwardly to and about the sheave 15 fixed on one end of the shaft of an electric motor 16, the current leads to which are in the form of a length of flexible extension cable 17 adapted for connection to any light socket or outlet and which when not in use may be folded in coils along the handle 2 as shown in Fig. 1. The motor at its end having the sheave 15 thereon abuts against the inner face of an upwardly projecting extension 6a formed with the casing head 6 and which is also arranged to form an enclosure for the belt 14 from end to end so that said belt cannot possibly contact with any exterior obstruction. Diametrally opposed studs 18 project from said end of the motor and through slots 19 formed in the extension 6a, said slots extending in a common radial line relative to the shaft 9 and that of the motor. A substantially semi-circular cover 20 concentric with the shaft 9 extends between the heads 6 and 7 over the upper portion of the reel and close to the blades; a flat member 21 extending rearwardly from the rear lower edge of said cover. This arrangement, as will be evident, encloses the reel in substantially the same manner as shown in said Jones patent and for the same purpose; providing the desired vacuum feature had in the previous device, which is enhanced by the use of the solid discs 11 between the blades and the shaft of the mower.

The heads 6 and 7, the extension 6a and the parts 20 and 21 in the present case however are preferably castings, so as to be rigid, and are rigidly connected together so as to provide a unit, proof against distortion by the load of the parts supported thereby, and will hereinafter be considered as a single casing, which it indeed is. At its rear end this casing is supported at its sides by substantially vertical links 22 which are pivoted at their upper ends on the frames 1 and at their lower ends on the casing. At the forward end of the casing a vertical slotted yoke 23 is fixed thereon centrally of its width and straddles the cross rod 3. A vertically adjustable set screw 24 is mounted in the top of the yoke to engage the upper surface of said rod, so as to enable the cutting level of the reel relative to the ground to be altered, as may be desired or necessary. A link 25 is pivoted at one end just to one side of the yoke on a crossbar 26 connected to the yoke at the top, the opposite end of the link being concaved as at 27 to disengageably straddle the upper surface of the rod 3. When this link is disengaged from the rod and is turned upwardly about its pivot the set screw will engage the rod and will support the adjacent end of the casing and mower. When the link is turned down to engage the rod however the set screw will be raised clear of the rod, since the length of the link is considerably greater than that of said screw and the casing and reel will then be raised so that the blade will be well clear of the ground.

This additional raising of the reel is had, as will be evident, without disturbing any previous adjustment or setting of the set screw which may have been made, so that upon disengaging said link from the rod the reel will reassume its previous cutting level without any further adjustments having to be made. In either case it will be seen that the casing and parts therein have a three point suspension from the main wheel mounted frame. This not only relieves the structure of any uneven strains when running but prevents the blades of the reel from getting out of line. Also adjusting the blade by means of a single screw insures the blades being at the same level at both ends, as is necessary for proper cutting purposes.

Disposed just inwardly of the casing heads at their rear ends are relatively short plates 28 which are connected at their forward ends by a fixed blade 29 arranged as usual to cooperate with the reel blades. Just rearwardly of the fixed blade the plates are provided with outwardly projecting circular bosses 30 which turnably seat in cradles 31 formed in the lower edges of said casing heads. The spindle 32 of a roller 33 is turnable in these bosses. The plates may be turned about the bosses as an axis so as to adjust the setting of the fixed blade relative to the reel blades by links 34 pivotally connected to said plates on both sides of the bosses and projecting upwardly through lateral flanges 35 on the casing for vertical adjustment relative thereto. By reason of the proximity of the roller to the center line of the reel and the supporting wheels 5 in a longitudinal plane, there is no chance for any high spots or hummocks in the lawn to be cut off unduly short or scalped by the blades as is the case with an ordinary lawn mower, since the roller engages the high ground so close to the plane of cutting of the blades as to prevent said blades thus cutting into the ground.

The adjustment of the plates on which the fixed blade is mounted being had about the axis of the roller, said roller does not change its position with any such adjustment.

As above stated, the roller engages the ground to prevent the blades from doing so when high spots are encountered. On level ground however said roller is held clear of the ground by reason of a trailer wheel 36 disposed rearwardly of the same, and centrally of the structure, which is supported from the handle bar by a rigid depending rod 37 detachably connected to the bar and swivelly connected to the fork 38 of the wheel. The heavy drag and resistance usually offered by the roller is therefore eliminated and the roller serves solely as a protection against scalping, as previously set forth.

Longitudinally extending rod 39 are swivelly connected to the fork and diverge thence to swivel connections with the rear ends of the casing. These rods not only brace the trailer wheel against longitudinal or lateral displacement, but also serve as supporting means for a grass catching receptacle 40, so that the weight of the grass as it accumulates in the receptacle is not dragged along the ground, and such weight is taken by the trailer wheel and not by the operator as usual.

Figure 2:
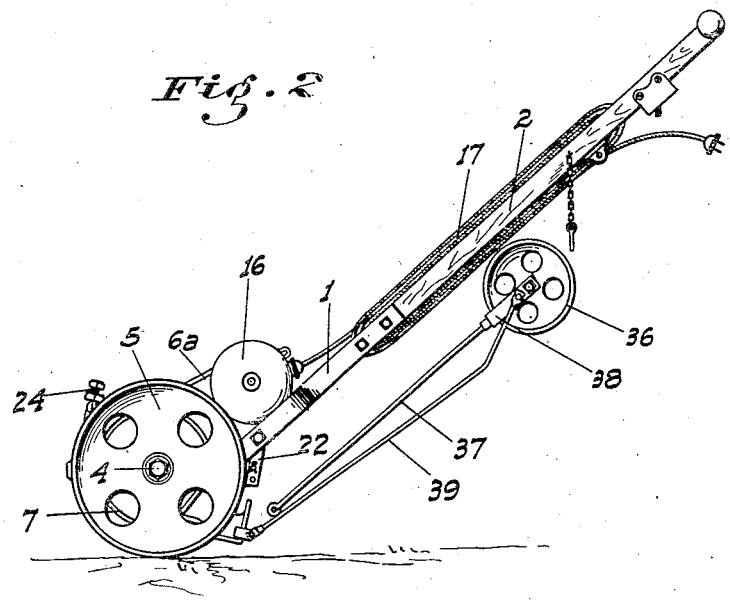
Fig. 2 is a similar view showing the grass catcher support in its folded position.

The rod 37 being detachable from the handle and the rods 39 being swivelling connected at their ends to the respective parts, the trailer wheel can be folded upwardly to lie adjacent the handle, as shown in Fig. 2, so that the device as a whole will occupy considerably less space when stored and not in use than it otherwise would.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A lawn mower including a casing structure, a reel turnably mounted therein, a fixed blade to cooperate with the reel, a roller to engage the ground adjacent said blade, means separate from the casing in which said blade and roller are mounted in common, and means supporting said last named means from the casing to enable the height of the blade to be altered at will without affecting the roller.

2. A lawn mower including a casing structure, a reel turnably mounted therein, a fixed blade to cooperate with the reel, a roller to engage the ground adjacent said blade, means separate from the casing in which said blade and roller are mounted in common, bosses formed on said means concentric with the roller and turnably mounted on the casing, and means applied to said first named means for turning the same about the bosses in either direction to adjust the blade.

3. A lawn mower including a frame structure, a reel turnably supported therefrom, an operating handle projecting rearwardly from the structure, a trailer wheel rearwardly of the reel, and means connecting said wheel with the handle and structure, to enable said wheel to ride on the ground and support some of the weight of the structure, or to be disposed in folded relation adjacent the handle.

4. A lawn mower including a frame structure, a reel turnably supported therefrom, an operating handle projecting rearwardly from the structure, a trailer wheel rearwardly of the reel, a vertical rod projecting upwardly from the wheel and detachably connected to the handle, and longitudinal rods flexibly connected to the wheel and to the adjacent end of the structure.

5. A lawn mower including a casing structure, a reel turnably mounted therein, an upwardly projecting extension on one end of the casing, an electric motor abutted against the inner face of said extension, means securing the motor to the extension for adjustment radially of the reel, and a driving connection between the end of the motor adjacent the casing extension and the adjacent end of the reel.

6. A lawn mower including a casing structure, a reel turnably mounted therein, an upwardly projecting extension on one end of the casing, a power plant secured to said extension for adjustment radially of the reel, and a driving connection between said power plant and the reel at the end thereof adjacent said extension.

7. A lawn mower including a casing structure, a reel turnably mounted therein, an upwardly projecting extension on one end of the casing, an electric motor abutted against the inner face of said extension, means securing the motor to the extension for adjustment radially of the mower, and a belt between the motor and the reel at the end thereof adjacent said extension; said casing and extension being arranged to completely surround and enclose the outer face and periphery of the belt.

8. A lawn mower including a frame, wheels supporting the same, a reel, a casing in which said mower is mounted, and a three-point suspension means between said frame and casing.

9. A lawn mower including a frame, wheels supporting the same, a reel, a casing in which said mower is mounted, links supporting the casing from the frame at the sides and one end of the casing, and a single vertically adjustable element supporting the other end of the casing from the frame centrally of the width of the casing.

10. A structure as in claim 9, with a nonadjustable element mounted in connection with but separate from said adjustable element for supporting said other end of the casing at a greater height from the ground than that obtainable with said adjustable element.

11. A lawn mower including a frame, wheels supporting the same, a reel, a casing in which said mower is mounted, links supporting the casing from the frame at the sides and one end of the casing, and means applied to the other end of the casing for adjusting the same vertically.

12. A lawn mower including a frame, wheels supporting the same, a reel, a casing in which said mower is mounted, links supporting the casing from the frame at the sides and one end of the casing, means applied to the other end of the casing for adjusting the same vertically to adjust the cutting level of the mower, and separate means to raise said end of the casing to cause the reel to be raised to a non-cutting position.

13. A lawn mower including a frame, wheels supporting the same, a reel, a casing in which said mower is mounted, links supporting the casing from the frame at the sides and one end of the casing, a cross rod provided with the frame beyond the end of the casing opposite to the links, a slotted yoke fixed on the casing centrally of its width and through which the rod projects, and a vertically adjustable set screw mounted in the top of the yoke to engage the rod.

14. A structure as in claim 13, with a link pivoted at one end in close association with the yoke at the upper end thereof; the link being of greater length than the setscrew and adapted at its other end, when the link is vertically disposed and depending from its pivoted end, to detachably bear on the rod.

In testimony whereof I affix my signature.

LEWIS W. VACHON.